US012427414B2

United States Patent
Ye et al.

(10) Patent No.: US 12,427,414 B2
(45) Date of Patent: Sep. 30, 2025

(54) METHOD AND APPARATUS FOR DISPLAYING PROMPT INFORMATION, STORAGE MEDIUM AND ELECTRONIC DEVICE

(71) Applicant: Tencent Technology (Shenzhen) Company Limited, Shenzhen (CN)

(72) Inventors: Bo Ye, Shenzhen (CN); Peicheng Liu, Shenzhen (CN); Liyuan Zou, Shenzhen (CN); Kai Tang, Shenzhen (CN); Xiaohao Liu, Shenzhen (CN); Zijian Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/369,712

(22) Filed: Sep. 18, 2023

(65) Prior Publication Data
US 2024/0001236 A1    Jan. 4, 2024

Related U.S. Application Data

(63) Continuation of application No. PCT/CN2022/131120, filed on Nov. 10, 2022.

(30) Foreign Application Priority Data

Jan. 24, 2022 (CN) .......................... 202210080651.0

(51) Int. Cl.
*A63F 13/533* (2014.01)
*A63F 13/52* (2014.01)
(Continued)

(52) U.S. Cl.
CPC ............ *A63F 13/533* (2014.09); *A63F 13/52* (2014.09); *A63F 13/5378* (2014.09); *A63F 13/87* (2014.09)

(58) Field of Classification Search
CPC .... A63F 13/533; A63F 13/52; A63F 13/5378; A63F 13/87
See application file for complete search history.

(56) References Cited

U.S. PATENT DOCUMENTS 10,695,674 B2 *   6/2020   Zhang ................ A63F 13/5255
10,866,730 B2 * 12/2020   Wang ................. A63F 13/5375
(Continued)

FOREIGN PATENT DOCUMENTS

CN    111309886 A    6/2020
CN    111884914 A    11/2020
(Continued)

OTHER PUBLICATIONS

Miffo. Phantasy Star Online Ver. 2—FAQ. Gamefaqs.com. Online. Oct. 2, 2001. Accessed via the Internet. Accessed Oct. 20, 2023. <URL: https://gamefaqs.gamespot.com/dreamcast/472540-phantasy-star-online-ver-2/faqs/12174> (Year: 2001).*
(Continued)

*Primary Examiner* — Carl V Larsen
(74) *Attorney, Agent, or Firm* — Morgan, Lewis & Bockius LLP

(57) ABSTRACT

A method for displaying prompt information is performed by an electronic device acting as a first electronic device participating in a virtual interaction scene, the method including: displaying a messaging interface, the messaging interface containing at least one piece of message template; and in response to a target operation on a target piece of message template of the at least one piece of message template, transmitting an instruction causing a second electronic device participating in the virtual interaction scene to display a target prompt information corresponding to the target piece of message template at a target position in the virtual interaction scene indicated by the target operation.

20 Claims, 11 Drawing Sheets

(51) Int. Cl.
*A63F 13/5378* (2014.01)
*A63F 13/87* (2014.01)

(56) References Cited

U.S. PATENT DOCUMENTS

| | | | | |
|---|---|---|---|---|
| 2004/0153557 | A1* | 8/2004 | Shochet | H04L 67/12 709/205 |
| 2007/0236475 | A1* | 10/2007 | Wherry | G06F 3/04883 345/173 |
| 2012/0096352 | A1* | 4/2012 | Maor | A63F 13/87 715/706 |
| 2018/0028907 | A1* | 2/2018 | Weng | G06F 3/04842 |
| 2019/0076739 | A1* | 3/2019 | Ge | A63F 13/537 |
| 2019/0121482 | A1* | 4/2019 | Lee | G06F 3/0488 |
| 2019/0208037 | A1* | 7/2019 | Yang | A63F 13/358 |
| 2019/0222632 | A1* | 7/2019 | He | G06F 3/04883 |
| 2020/0133439 | A1 | 4/2020 | Trim et al. | |
| 2021/0031106 | A1* | 2/2021 | Alderman | A63F 13/533 |
| 2021/0331070 | A1* | 10/2021 | Song | A63F 13/422 |
| 2022/0080308 | A1* | 3/2022 | Fung | A63F 13/847 |
| 2024/0307790 | A1 | 9/2024 | Han | |

FOREIGN PATENT DOCUMENTS

| | | |
|---|---|---|
| CN | 112190928 A | 1/2021 |
| CN | 112346636 A | 2/2021 |
| CN | 112818420 A | 5/2021 |
| CN | 113398601 A | 9/2021 |
| CN | 114470759 A | 5/2022 |
| JP | 2015203987 A | 11/2015 |
| JP | 2020022668 A | 2/2020 |

OTHER PUBLICATIONS

Ping. apexlegends.fandom.com. Online. Nov. 21, 2021. Accessed via the Internet. Accessed Oct. 20, 2023. <URL: https://apexlegends.fandom.com/wiki/Ping?oldid=54564> (Year: 2021).*
Whisper. piratesonline.fandom.com. Online. Sep. 19, 2018. Accessed via the Internet. Accessed Jun. 14, 2024. <URL: https://piratesonline.fandom.com/wiki/Whisper?oldid=330767> (Year: 2018).*
Tencent Technology, ISR, PCT/CN2022/131120, Feb. 8, 2023, 3 pgs.
Tencent Technology, Japanese Office Action, JP Patent Application No. 2024-525669, Apr. 17, 2025, 13 pgs.
Game With.jp, "[LoL Wild Rift] Types of Pings, How to Use Them, and When to Use Them [Wild Rift]", Last Updated: Dec. 2020, Retrieved from the Internet: https://gamewith.jp/wildrift/article/show/245289.

* cited by examiner

METHOD AND APPARATUS FOR DISPLAYING PROMPT INFORMATION, STORAGE MEDIUM AND ELECTRONIC DEVICE

CROSS-REFERENCE TO RELATED APPLICATIONS

This application is a continuation application of PCT Patent Application No. PCT/CN2022/131120, entitled "METHOD AND APPARATUS FOR DISPLAYING PROMPT INFORMATION, STORAGE MEDIUM AND ELECTRONIC DEVICE" filed on Nov. 10, 2022, which claims priority to Chinese Patent Application No. 2022100806510, entitled "METHOD AND APPARATUS FOR DISPLAYING PROMPT INFORMATION, STORAGE MEDIUM AND ELECTRONIC DEVICE" filed at China National Intellectual Property Administration on Jan. 24, 2022, all of which is incorporated herein by reference in its entirety.

FIELD OF THE TECHNOLOGY

This application relates to the field of computers, and in particularly to a method and an apparatus for displaying prompt information, a storage medium, a computer program product and an electronic device.

BACKGROUND OF THE DISCLOSURE

In order to facilitate players to communicate quickly in a game without affecting operations of the game, players are usually provided with a session template that can be triggered conveniently in related art, and players can send out prompt information when triggering the session template, but processing of this prompt information is with low accuracy, for example, other players who participate in a same game task together do not know which player the prompt information is for. Therefore, there is a problem of low displaying accuracy of prompt information.

SUMMARY

According to various embodiments provided in this application, a method and an apparatus for displaying prompt information, a storage medium, a computer program product and an electronic device are provided.

According to an aspect of the embodiments of this application, a method for displaying prompt information is performed by an electronic device acting as a first electronic device participating in a virtual interaction scene and the method includes: displaying a messaging interface, the messaging interface containing at least one piece of message template; and in response to a target operation on a target piece of message template of the at least one piece of message template, transmitting an instruction causing a second electronic device participating in the virtual interaction scene to display a target prompt information corresponding to the target piece of message template at a target position in the virtual interaction scene indicated by the target operation.

According to yet another aspect of the embodiments of this application, a non-transitory computer-readable storage medium stores computer-readable instructions. The computer-readable instructions, when executed by a processor of an electronic device acting as a first electronic device participating in a virtual interaction scene, cause the electronic device to execute the method for displaying prompt information described above.

According to yet another aspect of the embodiments of the application, an electronic device acting as a first electronic device participating in a virtual interaction scene is further provided, which includes a memory, a processor, and computer-readable instructions stored on the memory that, when executed by the processor, cause the electronic device to perform the method for displaying prompt information described above through the computer-readable instructions.

Details of one or more embodiments of this application are provided in the accompanying drawings and descriptions below. Other features, objectives, and advantages of this application become apparent from the specification, the drawings, and the claims.

BRIEF DESCRIPTION OF THE DRAWINGS

In order to explain technical schemes in embodiments of this application or in related art more clearly, the drawings required in the description of the embodiments or the related art will be briefly introduced below; obviously, the drawings in the following description are only some embodiments of this application, and other drawings can be obtained according to these drawings by those of ordinary skilled in the art without paying creative labor. The accompanying drawings described herein are used to provide a further understanding of this application, and form part of this application. Exemplary embodiments of this application and descriptions thereof are used to explain this application, and do not constitute any inappropriate limitation to this application. In the drawings.

BRIEF DESCRIPTION OF THE DRAWINGS

In order to make those skilled in the art better understand the schemes of this application, the technical schemes in the embodiments of this application will be described clearly and completely with reference to the drawings in the embodiments of this application in the following; and it is obvious that the described embodiments are only part of the embodiments of this application, but not all of them. All other embodiments obtained by those of ordinary skill in the art based on the embodiments of this application without creative efforts shall fall within the protection scope of this application.

It is to be understood that, in the specification, claims, and the foregoing accompanying drawings of this application, the terms "first", "second", and so on are intended to distinguish between similar objects rather than indicating a specific order. It is to be understood that such used data is interchangeable where appropriate so that the embodiments of this application described here can be implemented in an order other than those illustrated or described here. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

Figure 1:
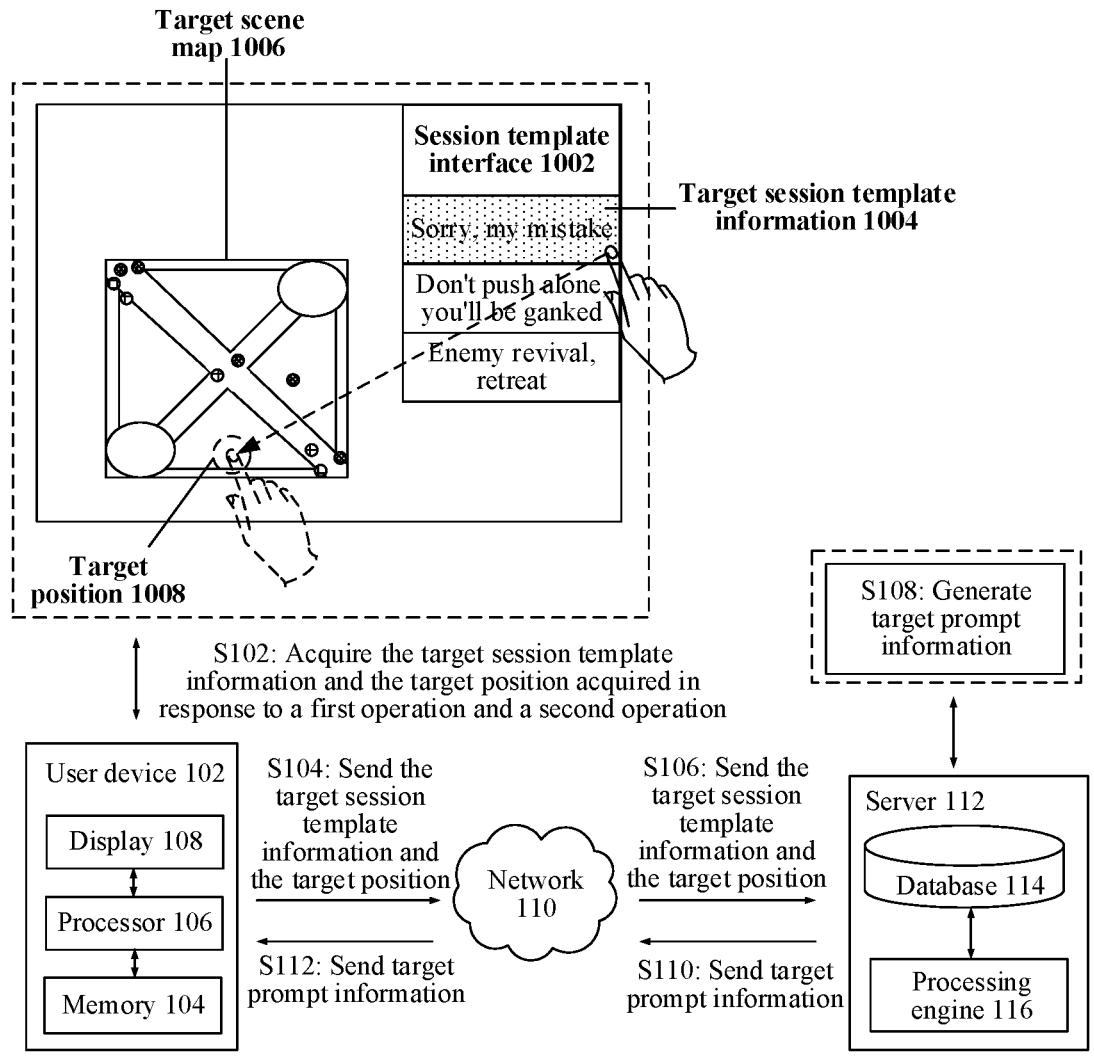
FIG. 1 is a schematic diagram of an application environment of an optional method for displaying prompt information according to an embodiment of this application.

According to an aspect of the embodiments of this application, a method for displaying prompt information is provided. As a possible implementation, the method for displaying prompt information can be applied to an environment as shown in FIG. 1, but not limited thereto. The environment may include, but is not limited to, a user device 102, a network 110 and a server 112. The user device 102 may include but is not limited to a display 108, a processor 106 and a memory 104.

A specific process is as follows:

Step S102: The user device 102 acquires target session template (also known as "messaging interface") information 1004 and a target position 1008 acquired in response to a first operation (a selection operation and a drag operation of the target session template information 1004 triggered on a session template interface 1002) and a second operation (a selection operation of the target position 1008 triggered on a target scene map 1006).

Step S104 to S106: The user device 102 sends the target session template information 1004 and the target position 1008 to the server 112 through the network 110.

Step S108: The server 112 processes the target session template information 1004 and the target position 1008 with a processing engine 116, so as to generate target prompt information.

Steps S110 to S112: The server 112 sends the target prompt information to the user device 102 through the network 110, and the processor 106 in the user device 102 displays the target prompt information in the display 108 and stores the target prompt information in the memory 104.

In addition to the example shown in FIG. 1, the above steps can be independently completed by the user device 102, that is, the user device 102 performs steps such as generating the target prompt information, thereby reducing a processing pressure of the server. The user device 102 includes, but is not limited to, a handheld device (such as a mobile phone), a notebook computer, a desktop computer, a vehicle-mounted device, etc. A specific implementation of the user device 102 is not limited in this application.

Figure 2:
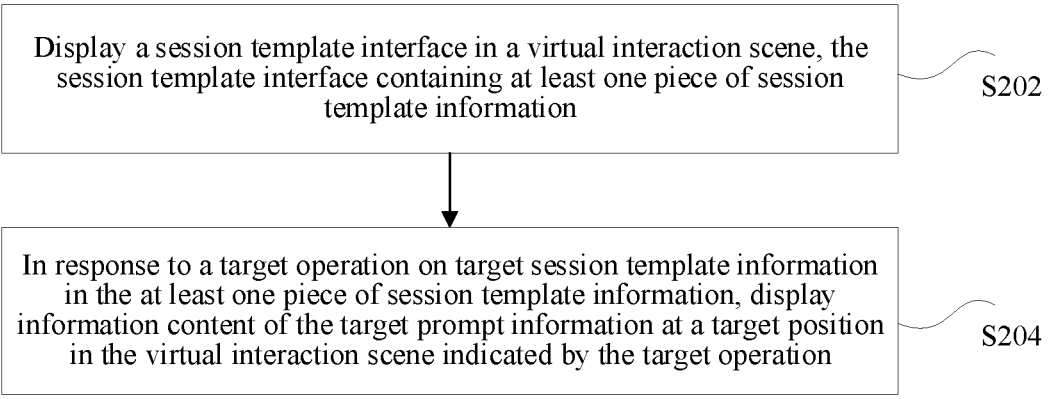
FIG. 2 is a schematic diagram of an optional method for displaying prompt information according to an embodiment of this application.

In some embodiments, as shown in FIG. 2, a method for displaying prompt information is performed by the electronic device, which specifically includes:

Step S202: Display a messaging interface, the messaging interface containing at least one piece of message template; and Step S204: In response to a target operation on a target piece of message template of the at least one piece of message template, transmitting an instruction causing a second electronic device participating in the virtual interaction scene to display a target prompt information corresponding to the target piece of message template at a target position in the virtual interaction scene indicated by the target operation.

In some embodiments, the method for displaying prompt information can be applied to, but not limited to, an interactive scene in which a shortcut word (the session template information) is accurately sent in a game, in which the virtual interaction scene is a virtual game scene. For example, after a user clicks on a shortcut word interface (the session template interface), presses a virtual button corresponding to the shortcut word (the first operation) and performs a drag operation, the electronic device closes the shortcut word interface and calls out a small map (the target scene map). Further, in response to the drag operation, the electronic device displays a sign corresponding to the shortcut word and drags it on the small map, and uses the drag operation to select (second operation) a position of the target position on the small map in the virtual game scene so as to send the shortcut word. After sending, the electronic device displays visual effect (the target prompt information) corresponding to the shortcut word on the target position to prompt a player in a targeted manner. In addition, if the target position the user drags to on the small map is a position of a teammate's avatar, it can be regarded as a special reminder for this teammate, but is not limited thereto.

In some embodiments, in the virtual interaction scene, for example, when the virtual game scene contains virtual objects of at least two camps, the target prompt information can be, but is not limited to, prompt information for virtual objects of a same camp. In addition, the target prompt information also can, but is not limited to, be played or sent in a form of voice, video, audio, etc. In some embodiments, the target prompt information comprises an information content or an identifier corresponding to the target piece of message template. In some embodiments, the instruction further causes the second electronic device to display identification information of the first electronic device as a sender of the target prompt information. In some embodiments, the target operation comprises a dragging operation on the target piece of message template on a map of the virtual interaction scene and the target position is determined based on an ending position of the dragging operation on the map, e.g., based on the ending position on the map and a mapping relationship between the map and the virtual interaction scene. In response to a start of the dragging operation, the map is displayed, which is then canceled in response to an end of the dragging operation. The map comprises an icon representing the second electronic device and the ending position is determined indicating a selection of the icon representing the second electronic device and a position of the second electronic device in the virtual interaction scene is determined as the target position. In some embodiments, the map comprises an icon representing the second electronic device and the instruction further causes the second electronic device to display identification information of the second electronic device as recipient and/or the target prompt information in a mini-map. A message is generated based on the target piece of message template and a relationship between the first electronic device and the second electronic device. For example, the second electronic device is associated with a teammate of a player at the first electronic device in the virtual interaction scene.

In some embodiments, the target prompt information can be acquired according to the target session template information and the target position indicated by the target operation. Acquiring the target prompt information according to the target session template information and the target position can be understood as, but not limited to, constructing association between the target prompt information corresponding to the target session template information and the target position, for example, determining information content of the target prompt information by using the target session template information and determining a display mode of the target prompt information by using the target position. The display mode can include, but not limited to, a display position, a display format, a display form, etc.

In addition, the acquiring the target prompt information according to the target session template information and the target position can also be understood as, but not limited to, integrating the information content of the target session template information and position information of the target position to acquire the target prompt information that prompts content of the target session template information for the target position. For example, if the content information of the target session template information is "beware of the enemy" and the target position is a position where a friendly defense tower is located, the information content of the target session template information "Beware of the enemy" and position information of the target position (friendly defense tower) are then integrated to acquire target prompt information "Beware of the enemy destroying the tower" which prompts content of the target session template information for the target position (friendly defense tower).

It is to be understood that, the electronic device displays the session template interface in the virtual interaction scene, the session template interface containing at least one piece of session template information; and the electronic device displays the target prompt information in response to the target operation on target session template information in the at least one piece of session template information; the target prompt information being used for characterizing information content of the target session template information and a target position indicated by the target operation.

The virtual interaction scene is a virtual scene that can support users to interact. For example, it can be a virtual game scene in which players can interact with each other. The virtual interaction scene can also be a virtual social scene, so users can have social interaction in the virtual social scene, such as dialogue and communication. The session template information is a preset target message when conducting a session in the virtual interaction scene, and the user can communicate with each other through the session template information, so as to avoid re-editing information and improve communication efficiency. The target session template information is the session template information selected by the user in the session template interface. The target prompt information can be based on the information content of the target session template information and the target position indicated by the target operation. The information content can refer to specific session content in the session template information, such as specific text content. The target position can include a position that needs to be prompted after the target operation selects the target session template information, which can be specifically a position in the virtual interaction scene, so that targeted prompt can be performed for a specific position in the virtual interaction scene.

With the embodiment provided by this application, the electronic device displays the session template interface in the virtual interaction scene, and the session template interface contains at least one piece of session template information. In response to the target operation triggered by the target session template information in the at least one piece of session template information, the information content characterizing the target session template information and the target prompt information of the target position indicated by the target operation are displayed, and a purpose of accurately displaying the prompt information is achieved by establishing the association between the target prompt information corresponding to the target session template information and the target position, thereby achieving technical effect of improving the displaying accuracy of the prompt information.

As an alternative scheme, the method includes: before displaying the target prompt information, S1: Display a target scene map corresponding to the virtual interaction scene in response to a first operation on the target session template information in the at least one piece of session template information; and S2: Acquire the target prompt information according to the target session template information and the target position in response to a second operation at the target position on the target scene map.

It is to be understood that, there are various types of information represented by the session template information, so there also are a plurality of session template information, so that respective session template information can be stored in the session template interface so as to be managed uniformly through the session template interface. When a display area of the session template interface itself is large, the session template interface can be hidden, and a complete session template interface can be unfolded when the session template information needs to be displayed. After the hidden session template interface is unfolded and displayed, the user can select the session template information to be displayed from the session template interface again, so as to communicate efficiently through the session template information.

In this embodiment, when the user selects the session template information to be displayed from the session template interface, the electronic device improves richness of the finally displayed target prompt information in more dimensions (such as dimension of the session template information and dimension of the position on the target scene map), so that the finally displayed target prompt information is richer and accuracy of the information prompt can be improved.

In some embodiments, when the virtual interaction scene is the virtual game scene, the target scene map corresponding to the virtual interaction scene can, but is not limited to, be displayed with corresponding sketchy pictures at various positions in the virtual game scene. For example, if a virtual defense tower is placed at a position A1 in the virtual game scene and the virtual defense tower is a key object, a sketchy sign corresponding to the virtual defense tower is displayed at a position A2 in the target scene map mapped to the position A1. If a virtual tree is placed at a position B1 in the virtual game scene and the virtual tree is a key object, a general sketchy picture is displayed at a position B2 in the target scene map mapped to the position B1.

In some embodiments, the first operation on the target session template information in the at least one piece of session template information may be, but is not limited to, a first selection operation performed on the target session template information. The second operation at the target position on the target scene map may be, but is not limited to, a second selection operation performed on the target position on the target scene map. In addition, in order to improve association between the first operation and the second operation, the second operation can, but is not limited to, be set to be allowed to be executed when the first operation is not finished. For example, if the first operation is a long press operation and when the long press operation is not finished, the target position on the target scene map is moved to through an intermediate operation (such as a drag operation), and a pop-up operation is further performed (or can be understood as an end operation of the long press operation described above) so as to determine the target position.

Figure 3:
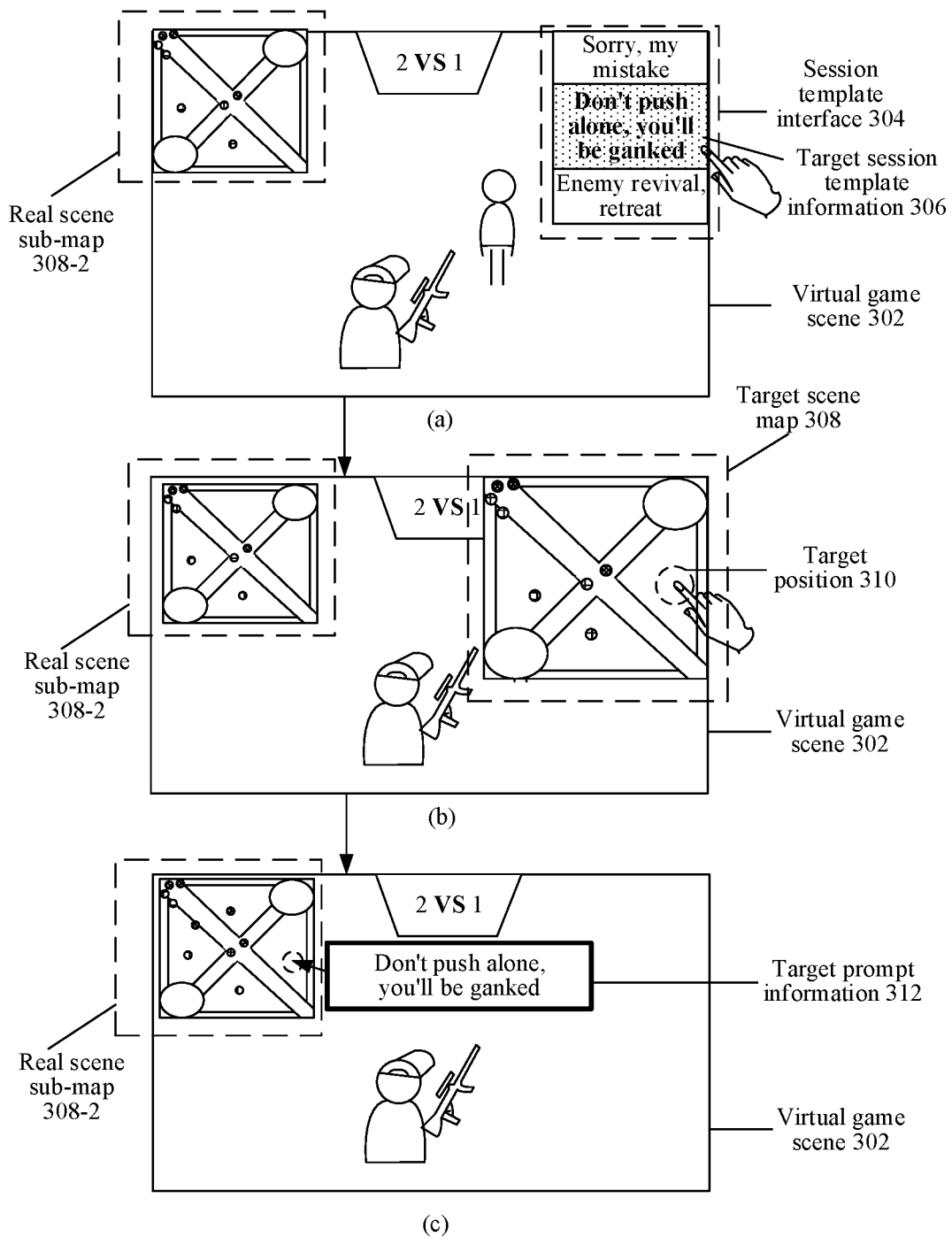
FIG. 3 is a schematic diagram of an optional method for displaying prompt information according to an embodiment of this application.

For further illustration, for example, as shown in FIG. 3, optionally the electronic device displays a virtual game scene 302 and a session template interface 304. The virtual game scene 302 is also displayed with a real scene mini-map 308-2, and the session template interface 304 contains at least one piece of session template information, such as session template information "Sorry, my mistake", session template information "Don't push alone, you will be ganked" and session template information "Enemy revival, retreat", as shown in FIG. 3 (a). Further, as shown in FIG. 3 (b), the electronic device displays a target scene map 308 corresponding to the virtual game scene in response to a first operation triggered by target session template information 306 "Don't push alone, you will be ganked" in the at least one piece of session template information. Furthermore, as shown in FIG. 3 (c), in response to a second operation triggered at a target position 310 on the target scene map 308, the electronic device displays target prompt information 312 acquired according to the target session template information 306 and the target position 310, for example, the electronic device displays information content of the target session template information 306 which is associated with the location corresponding to the target position 310 in the real scene mini-map 308-2.

As an alternative scheme, displaying the target prompt information includes: displaying a first prompt information; the first prompt information including identification information of a target object and the information content of the target session template information.

The target object is a virtual object worthy of prompting in the virtual interaction scene, such as a virtual building, a virtual role, a virtual prop, etc. The identification information is used for identifying the target object, and different target objects can be identified by different identification information. The information content refers to specific message content in the session template information, which can be specifically text content in the session template information.

In this embodiment, the first prompt information displayed by the electronic device includes the identification information of the target object and the information content of the target session template information, so that the information content can be prompted for the target object by displaying the first prompt information, which is facilitating improving of targeting of the information prompt.

As an alternative scheme, the method for displaying prompt information further includes: acquiring the first prompt information when a distance between a position corresponding to the target position and a position of the target object in the virtual interaction scene is less than or equal to a target threshold in the virtual interaction scene.

In some embodiments, the target object can be, but not limited to, an object in a key object list, where objects in the key object list can be, but not limited to, an object worthy of prompting, such as a virtual building, a virtual role, a virtual prop, etc.

It is to be understood that, when the virtual interaction scene is the virtual game scene, the electronic device acquires the first prompt information when a distance between a position corresponding to the target position in the virtual game scene and a position of the target object in the virtual game scene is less than or equal to a target threshold.

Figure 4:
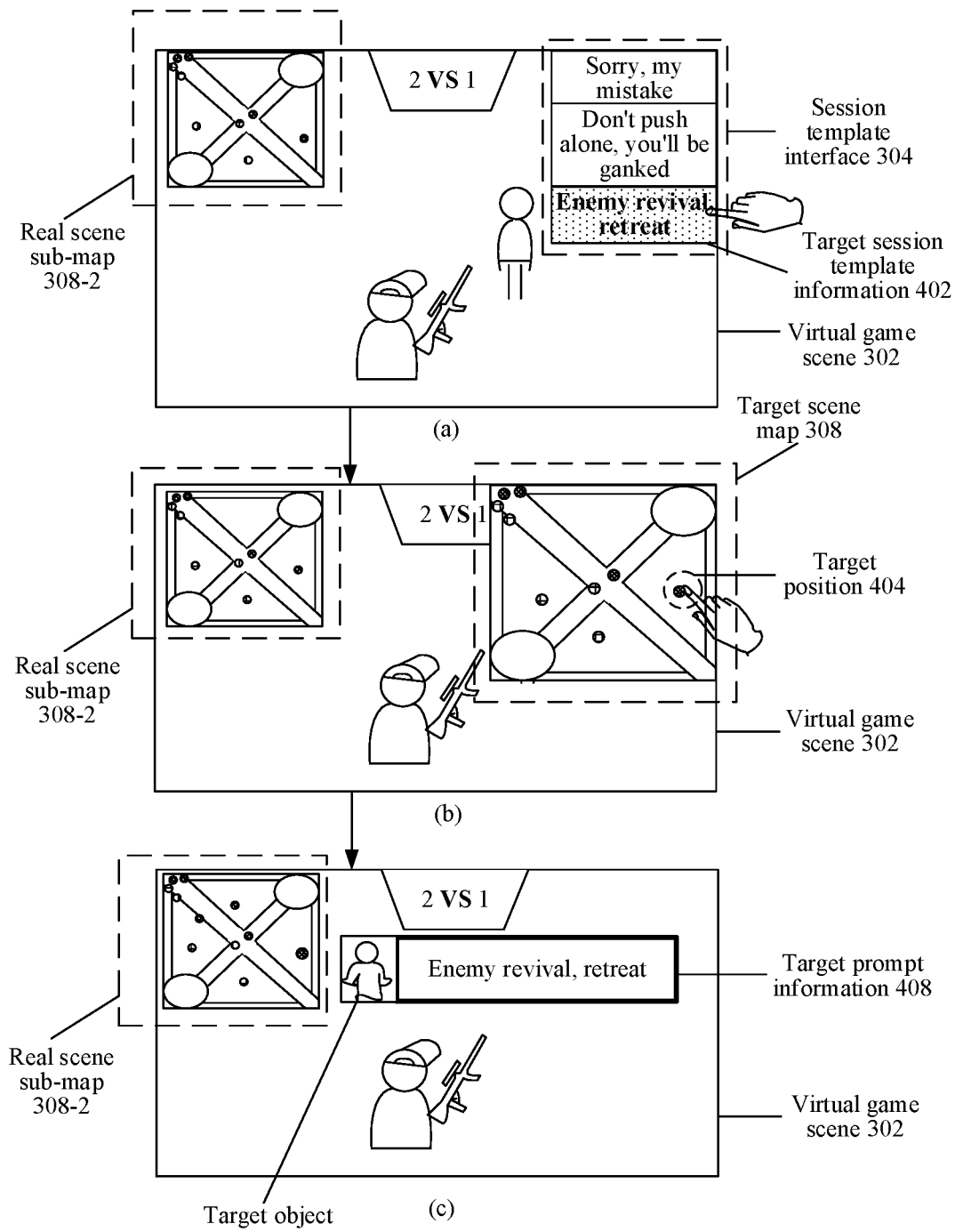
FIG. 4 is a schematic diagram of another optional method for displaying prompt information according to an embodiment of this application.

For further illustration, optionally, based on a scene shown in FIG. 3 and continuing as shown, for example, in FIG. 4, the electronic device displays a virtual game scene 302 and a session template interface 304. The virtual game scene 302 is also displayed with a real scene mini-map 308-2, and the session template interface 304 contains at least one piece of session template information, such as session template information "Sony, my mistake", session template information "Don't push alone, you will be ganked" and session template information "Enemy revival, retreat", as shown in FIG. 4 (a). Further, as shown in FIG. 4 (b), in response to a first operation triggered by target session template information 402 "Enemy revival, retreat", the electronic device displays the target scene map 308 corresponding to the virtual game scene. Furthermore, as shown in FIG. 4 (c), in response to a second operation triggered at a target position 404 on the target scene map 308, the electronic device displays target prompt information 408 (first prompt information) acquired according to the target session template information 402 and the target position 404 when a distance between a position corresponding to the target position 404 in the virtual game scene and a position of the target object in the virtual game scene is less than or equal to a target threshold. The target prompt information 408 includes identification information of the target object 406 and information content of the target session template information 402.

In this embodiment, the electronic device triggers generation processing of the first prompt information according to the distance between the target position and the target object, which can simplify a generation operation of the prompt information and facilitates improving of operation efficiency of information prompt.

As an alternative scheme, the target object includes a first virtual role. The method for displaying prompt information further includes: acquiring second prompt information; the second prompt information including identification information of the first virtual role, identification information of a second virtual role and the information content of the target session template information, the second virtual role being a virtual role controlled by a second client, and the second client being a client that triggers the target operation; and sending the second prompt information to a first client, so that the second prompt information is displayed in the first client; the first client being a client that controls the first virtual role.

In some embodiments, the first virtual role and the second virtual role can, but not limited to, be in a same camp and then the second prompt information is sent to virtual roles in a same camp separately, so as to improve targeting of the information prompt. Moreover, in this embodiment, the first virtual role and the second virtual role can, but not limited to, be in different camps, and then the second prompt information is sent to virtual roles of any camp separately, thus realizing an information interaction function similar to private chat.

With the embodiment provided by the application, the electronic device acquires the second prompt information, the second prompt information including identification information of the first virtual role, identification information of a second virtual role and the information content of the target session template information, the second virtual role being a virtual role controlled by a second client and the second client being a client that triggers the target operation; and sends the second prompt information to the first client, so that the second prompt information can be displayed in the first client, the first client being a client that controls the first virtual role, thus achieving a purpose of targeted information displaying and improving targeting of information display.

As an alternative scheme, the target object includes a third virtual role. The method for displaying prompt information further includes: acquiring target association information between the third virtual role and a second virtual role, the second virtual role being a virtual role controlled by a second client, and the second client being a client that triggers the target operation; and adjusting the information content of the target session template information according to the target association information. The displaying the target prompt information includes: displaying third prompt information, the third prompt information including identification information of the third virtual role, the identification information of the second virtual role and information content of the adjusted target session template information.

It is to be understood that, the electronic device acquires target association information between the third virtual role and a second virtual role, the second virtual role being a virtual role controlled by a second client, and the second client being a client that triggers a target operation; adjusting the information content of the target session template information according to the target association information; displays the third prompt information, the third prompt information including identification information of the third virtual role, the identification information of the second virtual role and information content of the adjusted target session template information. The target association information refers to interaction between the third virtual role and the second virtual role. Based on this interaction, the information content of the target session template information can be adjusted correspondingly, thus improving targeting of prompting of the target session template information.

Figure 5:
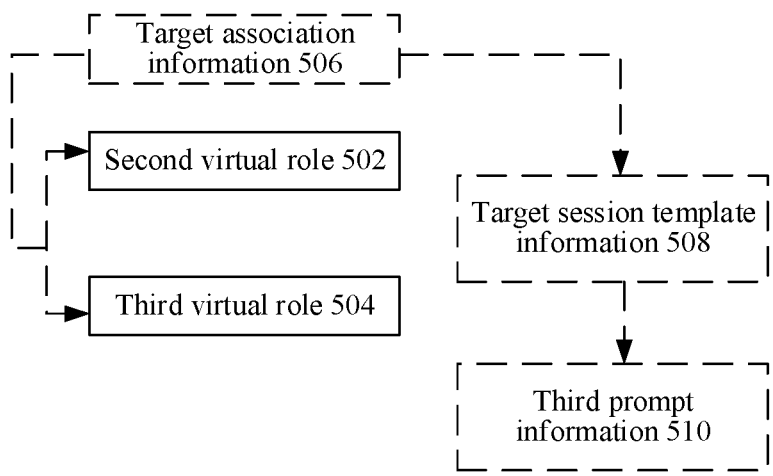
FIG. 5 is a schematic diagram of another optional method for displaying prompt information according to an embodiment of this application.

For further illustration, for example, as shown in FIG. 5, optionally the electronic device can acquire target association information 506 between a third virtual role 504 and a second virtual role 502, for example there's a target interaction between the third virtual role 504 and the second virtual role 502. The electronic device adjusts information content of target session template information 508 according to the target association information 506, such as adjusting the information content of the target session template information 508 like "beware of the enemy" to "Bro, beware of the enemy". Further, the electronic device displays third prompt information 510. The third prompt information 510 includes identification information of the third virtual role 504, identification information of the second virtual role 502 and information content of the adjusted target session template information 508, such as "Bro, beware of the enemy".

In some embodiments, when the virtual interaction scene of the electronic device is the virtual game scene, role association information can be, but not limited to, understood as target interaction set for game background. For example, if a virtual role A and a virtual role B are lovers in the game background, the information content of the target session template information is adjusted according to a lover relationship between the virtual role A and the virtual role B in the game background when a first account controls the virtual role A and a second account controls the virtual role B to participate in a virtual game together.

In this embodiment, the electronic device adjusts the information content of the target session template information based on the target association information between the third virtual role and the second virtual role, so as to prompt through the adjusted target session template information, which can improve targeting of the target session template information.

As an alternative scheme, the adjusting the information content of the target session template information according to the target association information includes at least one of:

S1: Adjust the information content of the target session template information according to account association information between an account corresponding to the third virtual role and an account corresponding to the second virtual role;

S2: Adjust the information content of the target session template information according to role association information between the third virtual role and the second virtual role; and S3: Adjust the information content of the target session template information according to the target association information and expression object information of the information content of the target session template information. The expression object information is used for representing attribute information of an expression object targeted by the information content of the target session template information.

In some embodiments, the account association information can be, but is not limited to, interaction tightness between accounts, specifically, interaction tightness between game accounts. The interaction tightness can, but not limited to, be improved by participating in a virtual game together or giving virtual props to each other. The role association information refers to association between the third virtual role and the second virtual role, such as teammates, opponents and other types of association.

In some embodiments, the expression object information is used for representing the attribute information of the expression object of the information content of the target session template information, and the expression object includes at least one of: it, he, she, they, everyone, you, me, etc. For further illustration, optionally, it is assumed that the information content of the target session template information before adjustment is "Be careful, everyone" and the expression object in the acquired expression object information is a separate object, and in this way, a problem of ideographic error may appear when the expression object "Everyone" is used again, and then the information content of the target session template information is adjusted from "Be careful, everyone" to "Be careful, man".

With the embodiment provided by the application, the electronic device adjusts the information content of the target session template information according to the account association information between the account corresponding to the third virtual role and the account corresponding to the second virtual role; adjusts the information content of the target session template information according to the role association information between the third virtual role and the second virtual role; and adjusts the information content of the target session template information according to the target association information and the expression object information targeted by the information content of the target session template information, the expression object information being used for representing the attribute information of the expression object of the information content of the target session template information, thus achieving a purpose of flexibly adjusting the information content and improving display flexibility of the information content.

As an alternative scheme, the method for displaying prompt information further includes: displaying a session operation identifier on the session template interface. The session operation identifier is in one-to-one correspondence with the session template information in the at least one piece of session template information. The displaying the target scene map corresponding to the virtual interaction scene in response to the first operation on the target session template information in the at least one piece of session template information includes: displaying the target scene map corresponding to the virtual interaction scene in response to the first operation triggered by a target operation identifier corresponding to the target session template information.

It is to be understood that, the session operation identifier in one-to-one correspondence with the session template information in the at least one piece of session template information is displayed on the session template interface. The target scene map is displayed in response to the first operation triggered by the target operation identifier corresponding to the target session template information.

Figure 6:
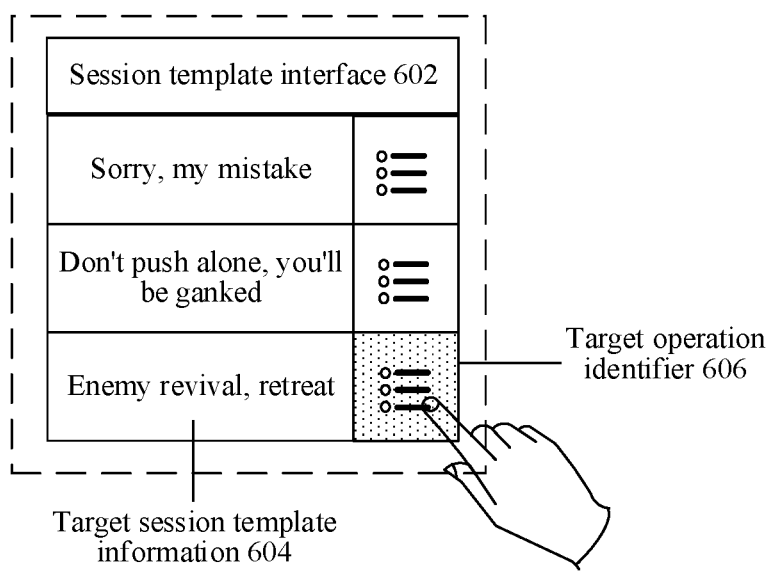
FIG. 6 is a schematic diagram of another optional method for displaying prompt information according to an embodiment of this application.

For further illustration, as shown in FIG. 6 for example, optionally, the electronic device displays a target operation identifier 606 in a session template interface 602 corresponding to target session template information 604 (for example, "Enemy revival, retreat"). At least one session operation identifier is displayed in the session template interface 602, and the session operation identifier in the at least one session operation identifier is in one-to-one correspondence with the session template information in the at least one piece of session template information, and the at least one session operation identifier includes a target operation identifier 606. Further, the first operation triggered on the target operation identifier 606 is acquired.

In this embodiment, the electronic device displays the session operation identifier on the session template interface to support the user to trigger interaction through the session operation identifier, which facilitates improving of operation efficiency of information prompt.

As an alternative scheme, the method for displaying prompt information further includes: updating the session template information displayed in the session template interface in response to an information switching request triggered by the at least one piece of session template information.

In some embodiments, an interface switching request triggered by any session template information in at least one piece of session template information is acquired, the interface switching request is used for requesting to switch a display sub-interface of the session template interface, and the at least one piece of session template information is located in a first display sub-interface of the session template interface. Session template information in a second display sub-interface of the session template interface is displayed, and the second display sub-interface is different from the first display sub-interface.

In some embodiments, the electronic device directly performs interface switching on any session template information in the at least one piece of session template information, which can improve interface switching efficiency, but is easy to cause false touch at the same time, and further, in this embodiment, the session operation identifier in at least one session operation identifier is set to be in one-to-one correspondence with the session template information in at least one piece of session template information, and the first operation is triggered by the session operation identifier, so that a relationship between the first operation and any session template information is decoupled, thus reducing false touch probability.

Figure 7:
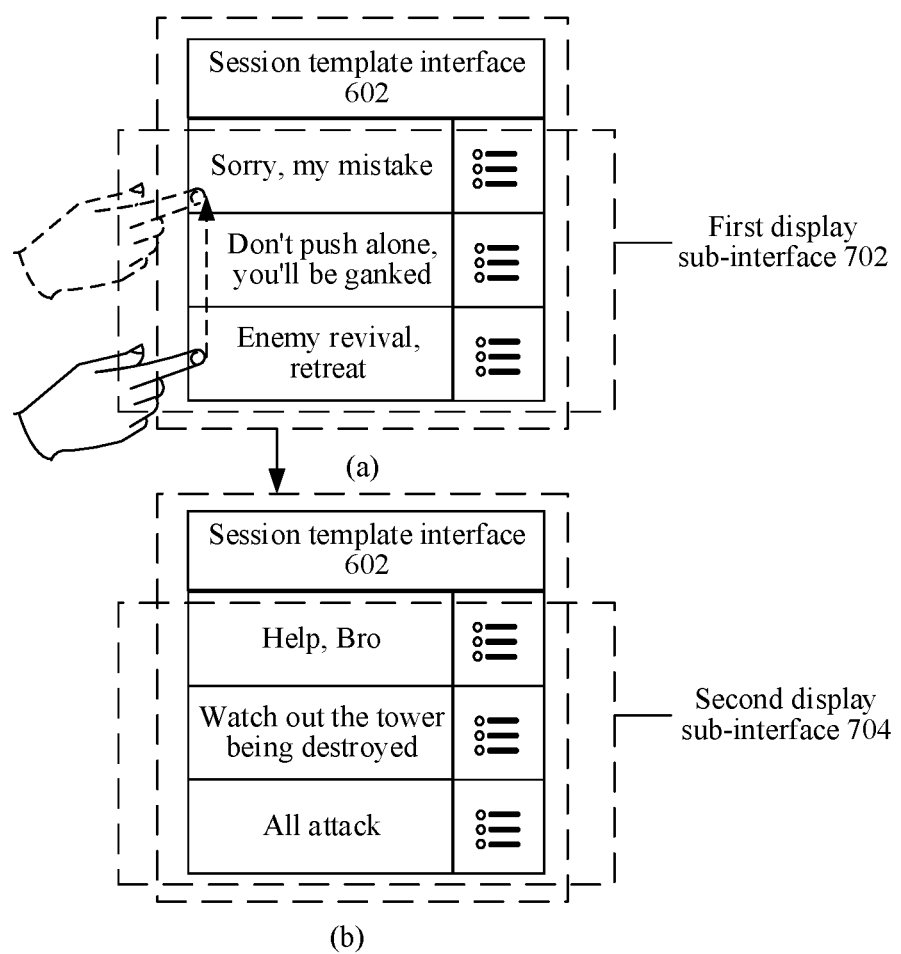
FIG. 7 is a schematic diagram of another optional method for displaying prompt information according to an embodiment of this application.

For further illustration, optionally, based on FIG. 6 and continuing as shown, for example, in FIG. 7, a sliding operation triggered by any session template information in a first display sub-interface 702 of the session template interface 602 is acquired, as shown in FIG. 7 (*a*). Further as shown in FIG. 7 (*b*), session template information in a second display sub-interface 704 of the session template interface 602 is displayed. The session template information in the second display sub-interface 704 is different from that in the first display sub-interface 702.

As an alternative scheme, the method for displaying prompt information further includes:

S1: Acquire a selection operation performed on the target operation identifier; and S2: Determine the selection operation as the first operation triggered on the target operation identifier when an operation duration of the selection operation reaches a target threshold.

The first operation can be, but not limited to, a long press operation triggered on the session template interface, and the second operation can be, but not limited to, a pop-up operation where the long press operation ends at the target position on the target scene map. In addition, it is possible, but not limited to, to use a drag operation to associate the first operation with the second operation. Specifically, the user can press and hold down on the target operation identifier to trigger the selection operation, and the electronic device can detect an operation duration of the selection operation. When the duration reaches a target threshold, the electronic device can determine the selection operation as the first operation triggered on the target operation identifier.

In this embodiment, with the continuous selection operation for the session operation identifier to trigger the first operation, the relationship between the first operation and any session template information is decoupled, and the false touch probability can be reduced.

As an alternative scheme, the method for displaying prompt information further includes:

S1: Acquire a first position on the target scene map at an end of a drag operation in a first direction when the selection operation is not finished and the drag operation is acquired; and S2: Determine the first position as the target position when the drag operation in the first direction is finished.

In some embodiments, the first operation can be, but not limited to, a long press operation triggered on the session template interface, and the second operation can be, but not limited to, a pop-up operation where the long press operation ends at the target position on the target scene map. In addition, it is possible, but not limited to, to use a drag operation to associate the first operation with the second operation.

It is to be understood that, the electronic device acquires a first position on the target scene map when the drag operation is stopped when the selection operation is not finished and the drag operation in a first direction is acquired. The electronic device determines the first position as the target position when the drag operation in the first direction and/or the selection operation are finished. The first direction is a direction in which the user drags the selected target operation identifier to move.

Figure 8:
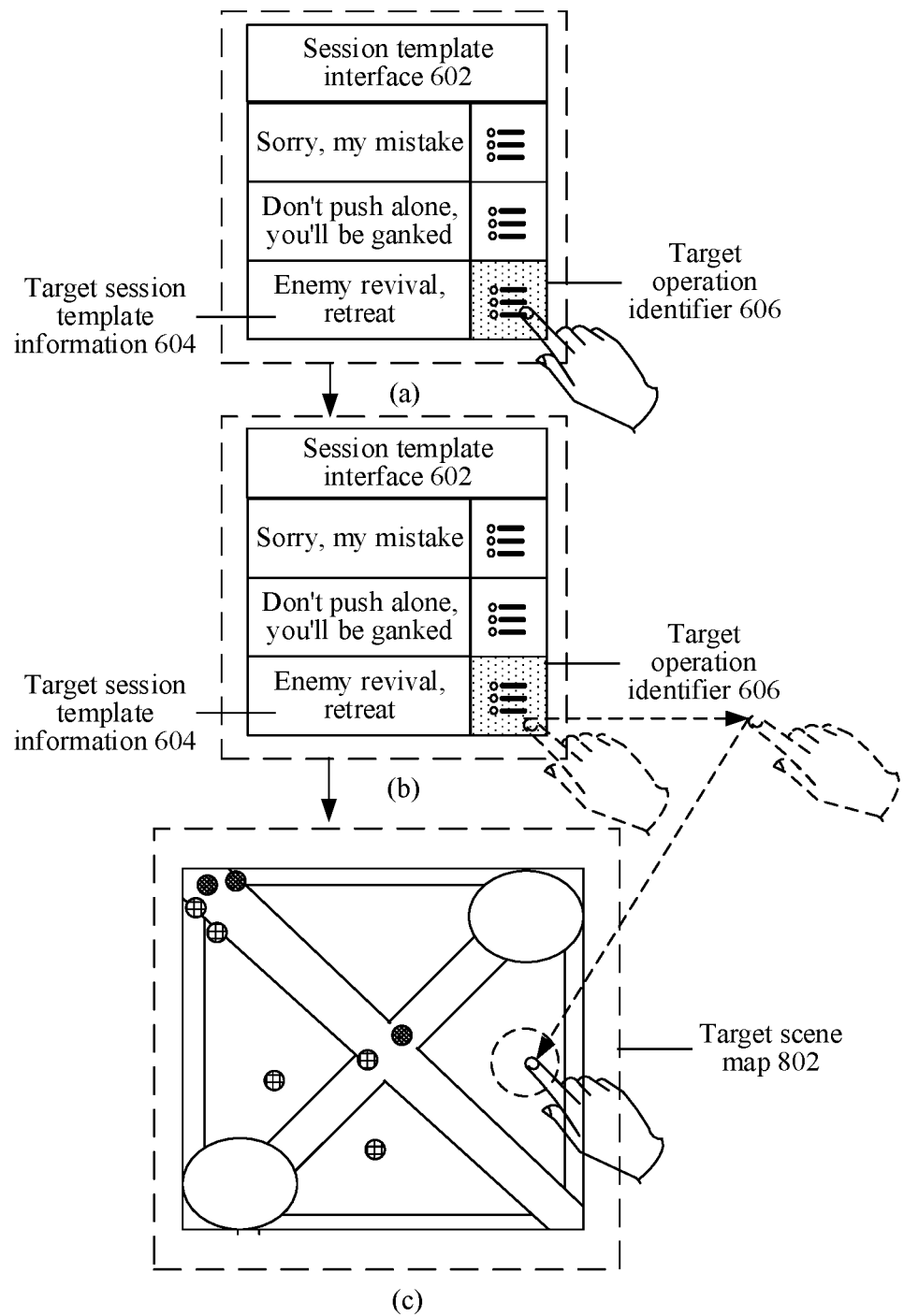
FIG. 8 is a schematic diagram of another optional method for displaying prompt information according to an embodiment of this application.

For further illustration, optionally, based on a scene shown in FIG. 6 and continuing as shown, for example, in FIG. 8, the electronic device displays the session template interface 602 and acquires the selection operation triggered by a target operation identifier 606 corresponding to the target session template information 604, as shown in FIG. 8 (*a*). As shown in FIG. 8 (*b*), the drag operation in the first direction is acquired. Further, in response to the selection operation and the drag operation, the electronic device displays the target scene map 802 and acquires the first position on the target scene map 802 when the drag operation is stopped. Assuming that the drag operation in the first direction and/or the selection operation are finished at this time, the electronic device determines the first position as the target position.

In this embodiment, the electronic device determines the first position on the target scene map when the drag operation in the first direction is finished as the target position when it detects that the selection operation is not finished and the drag operation in the first direction is acquired, so that the user can be supported to flexibly select on the target scene map, which facilitates improving of processing efficiency of information prompts.

As an alternative scheme, the method for displaying prompt information further includes: moving a display position of the target session template information in the session template interface when the selection operation is not finished and a drag operation in a second direction is acquired.

In some embodiments, the operation identifier can be set as, but not limited to, an identifier that can trigger various operations. For example, the selection operation and the drag operation in the first direction can trigger the first operation, and the selection operation and the drag operation in the second direction can trigger a moving operation to move the display position of the target session template information and/or the target operation identifier in the session template interface.

In this embodiment, the electronic device can change the display position of the target session template information in the session template interface according to the drag operation triggered by the user, so that the user can quickly select the target session template information, which facilitates improving of the processing efficiency of information prompt.

As an alternative scheme, the displaying the session template interface in the virtual interaction scene includes: displaying the session template information identifier in the virtual interaction scene; and displaying the session template interface in the virtual interaction scene in response to an unfolding operation performed on the session template information identifier.

The session template information identifier, as display entrance of respective session template information, is used for interacting through the session template information identifier, so that the respective session template information can be displayed in the virtual interaction scene. Specifically, the electronic device can display the virtual interaction scene and display the session template information identifier in the virtual interaction scene, for triggering an operation for the session template information identifier, for example, the user triggers an unfolding operation for the session template information identifier and the electronic device displays the session template interface in the virtual interaction scene, so that the user can interact through the respective session template information in the session template interface.

Figure 9:
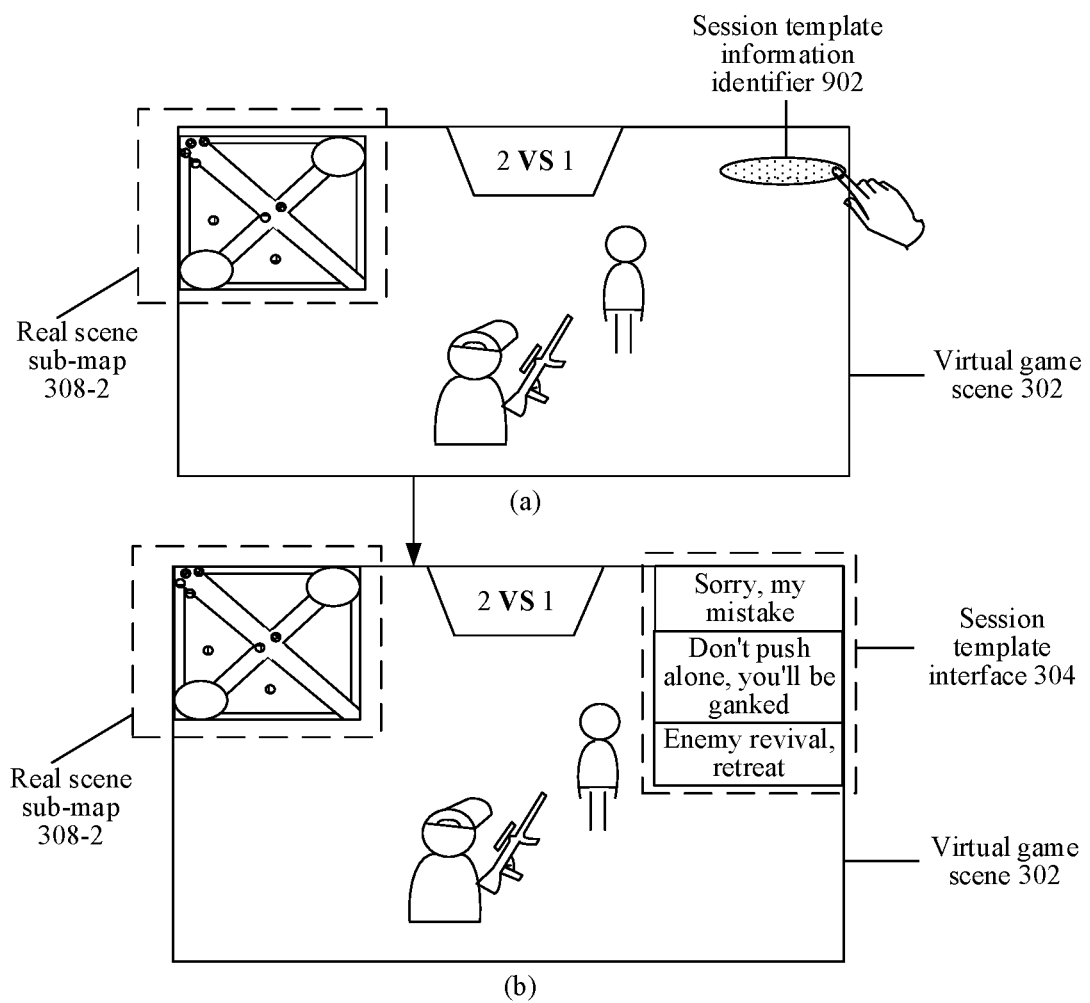
FIG. 9 is a schematic diagram of another optional method for displaying prompt information according to an embodiment of this application.

For further illustration, optionally, based on a scene shown in FIG. 3 and continuing as shown, for example, in FIG. 9, the electronic device displays the virtual game scene 302 and the session template information identifier 902, as shown in FIG. 9 (*a*). As further shown in FIG. 9 (*b*), the electronic device displays the session template interface 304 in response to the unfolding operation triggered on the session template information identifier 902.

In this embodiment, by using the session template information identifier as the display entrance of respective session template information, the electronic device can properly hide the session template interface to avoid shielding of the session template interface to the virtual interaction scene, so as to ensure operation efficiency of various interactions in the virtual interaction scene.

As an alternative scheme, the displaying the target prompt information includes at least one of: displaying the target prompt information at a position in the virtual interaction scene corresponding to the target position; and displaying a prompt identifier matching with the target session template information at the position in the virtual interaction scene corresponding to the target position.

In some embodiments, in order to improve display intuition of the target prompt information, the electronic device can, but is not limited to, directly display the target prompt information at the position in the virtual game scene corresponding to the target position. In addition, considering that an information display area of the target prompt information may be too large, it is easy to block user's line of sight. Further, when the information display area of the target prompt information can, but is not limited to, exceed a display threshold, the prompt identifier matching with the target session template information is displayed at the position in the virtual game scene corresponding to the target position to replace information display of the target prompt information, thus ensuring operation efficiency of various interactions in the virtual interaction scene.

As an alternative scheme, the method for displaying prompt information further includes:

S1: Display an information configuration interface for the session template information, the information configuration interface including a first configuration interface and a second configuration interface, the first configuration interface containing existing session template information in the session template interface and the second configuration interface containing non-existing session template information in the session template interface; and S2: Perform configuration processing on session template information contained in the target configuration interface in response to an information configuration request triggered on the target configuration interface; the target configuration interface including at least one of the first configuration interface or the second configuration interface.

In some embodiments, the session template information can be, but is not limited to, user-defined input information, and can also be, but is not limited to, optional session template information provided by a system for the user in the second configuration interface, the target configuration interface including at least one of the first configuration interface or the second configuration interface.

It is to be understood that, the electronic device displays the information configuration interface of the session template information, and the information configuration interface includes the first configuration interface and the second configuration interface, the first configuration interface contains the existing session template information in the session template interface and the second configuration interface contains the non-existing session template information in the session template interface. The electronic device performs configuration processing on the existing session template information in response to the first information configuration request triggered on the first configuration interface; and/or the electronic device performs configuration processing on the non-existing session template information in response to the second information configuration request triggered on the second configuration interface.

Figure 10:
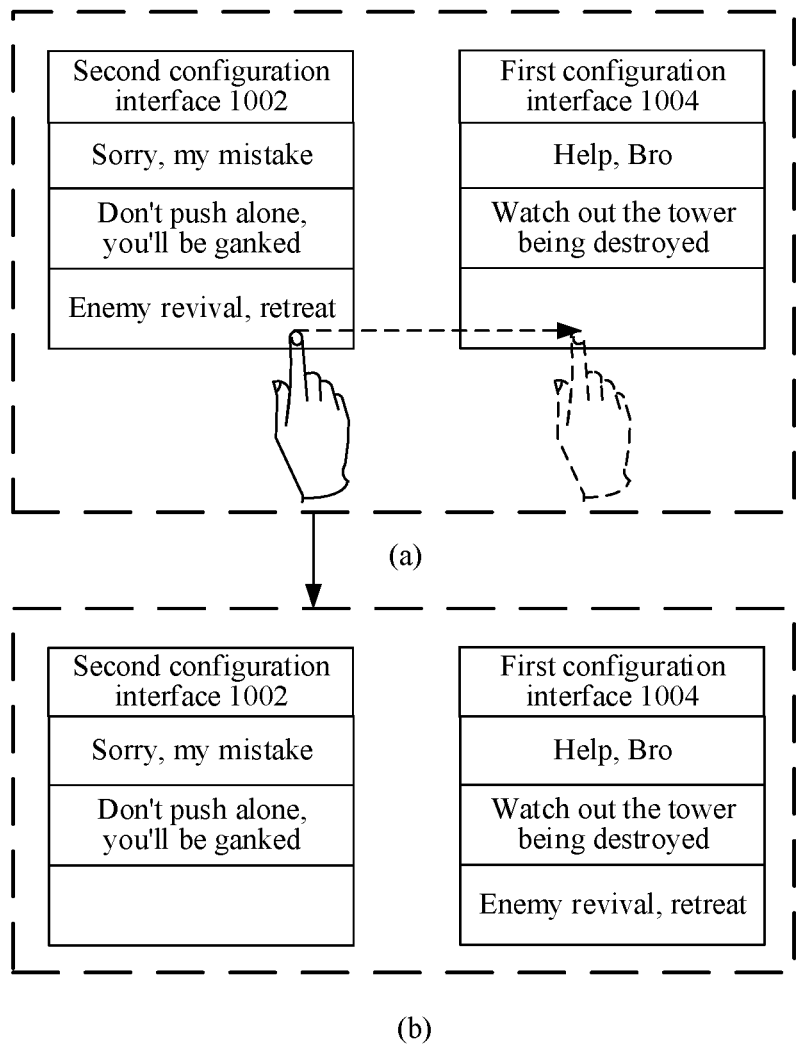
FIG. 10 is a schematic diagram of another optional method for displaying prompt information according to an embodiment of this application.

For further illustration, as shown in FIG. 10 for example, optionally, the electronic device displays a first configuration interface 1004 and a second configuration interface 1002. The first configuration interface 1004 contains the existing session template information in the session template interface, and the second configuration interface 1002 contains the non-existing session template information in the session template interface, as shown in FIG. 10 (a). As further shown in FIG. 10 (b), the electronic device transfers session template information "Enemy revival, retreat" in the second configuration interface 1002 to the first configuration interface 1004, in response to a second information configuration request triggered on the second configuration interface 1002.

With the embodiment provided by this application, the electronic device displays the information configuration interface of the session template information, and the information configuration interface includes the first configuration interface and the second configuration interface, the first configuration interface contains the existing session template information in the session template interface and the second configuration interface contains the non-existing session template information in the session template interface; performs configuration processing on the existing session template information in response to the first information configuration request triggered on the first configuration interface; and/or performs configuration processing on the non-existing session template information in response to the second information configuration request triggered on the second configuration interface, thereby achieving effect of improving the processing efficiency of the session template information.

As an alternative scheme, the method for displaying prompt information further includes:

S1: Display an image template interface in the virtual interaction scene, the image template interface containing at least one template image;

S2: Display the target scene map corresponding to the virtual interaction scene in response to a third operation triggered on a target template image in the at least one template image;

S3: Acquire a target prompt image according to the target template image and the second position in response to a fourth operation triggered at the second position on the target scene map; and S4: Display the target prompt image.

In some embodiments, the template image can be, but is not limited to, a static image or a dynamic image, such as an in-game expression, a graffiti identifier, a game icon, a sender identifier (such as an account identifier that triggers the target prompt information), and the like.

It is to be understood that, in addition to the session template information, the template image can also, but is not limited to, make the communication more accurate and richer through an interactive scheme similar to the method for displaying prompt information described above. For example, after opening the image template interface, the target template image is pressed and dragged, and then the image template interface is closed, then the small map is called out, on which the target position can be selected to display the target template image, or the target template image is sent to the target object where the target position is located, so as to realize more accurate image interaction.

Figure 11:
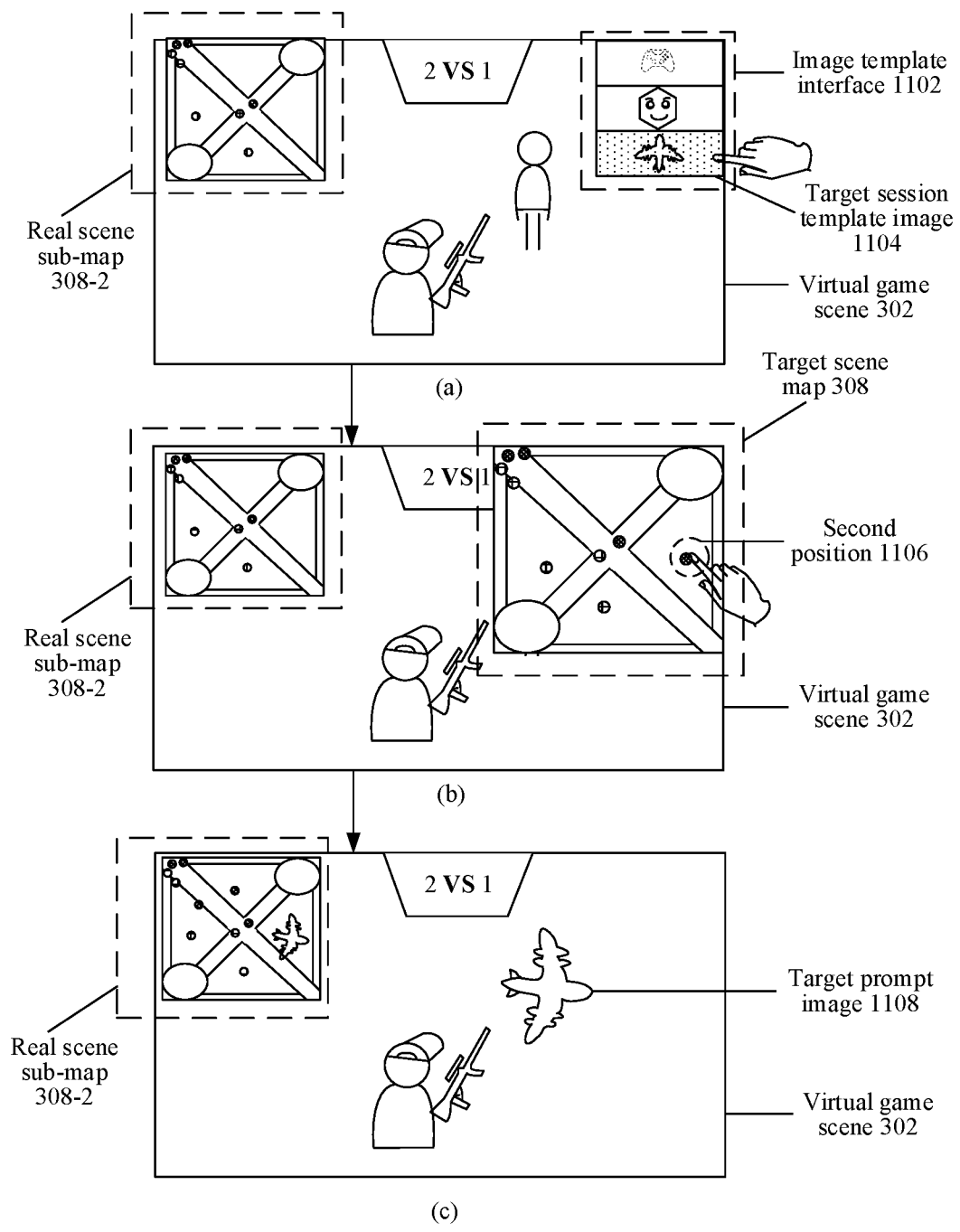
FIG. 11 is a schematic diagram of another optional method for displaying prompt information according to an embodiment of this application.

For further illustration, optionally, as shown in FIG. 3 and continuing as shown, for example, in FIG. 11, the electronic device displays the virtual game scene 302 and the image template interface 1104, and the virtual game scene 302 is also displayed with a real scene mini-map 308-2, as shown in FIG. 11 (a). As further shown in FIG. 11 (b), the electronic device displays the target scene map 308 in response to the third operation triggered on the target template image 1104. Furthermore, as shown in FIG. 11 (c), the electronic device displays a target prompt image 1108 acquired according to the target template image 1104 and a second position 1106 in response to a fourth operation triggered at a second position 1106 on the target scene map 308. In addition, the target prompt image 1108 can also be displayed in the real scene mini-map 308-2, but is not limited thereto.

In this embodiment, the electronic device displays the image template interface in the virtual interaction scene, the image template interface containing at least one template image; and displays the target prompt image in response to the third operation triggered on the target template image in the at least one template image. The target prompt image is acquired by acquiring the target prompt image according to the target template image and the second position, so that a purpose of accurately displaying the prompt image is achieved, and technical effect of improving the displaying accuracy of the prompt image is achieved.

As an alternative scheme, in order to facilitate understanding, the method for displaying prompt information described above is applied to an interactive scene of accurately sending shortcut word (the session template information) in a game. For example, after a shortcut word interface (the session template interface) is clicked and opened, a virtual button corresponding to the shortcut word is pressed (the first operation) and a drag operation is performed, the shortcut word interface is closed and a small map (the target scene map) is called out. Then, an identifier corresponding to the shortcut word is displayed and dragged on the small map in response to the drag operation, and a position of the target position on the small map in the virtual game scene is selected (the second operation) by using the drag operation so as to send the shortcut word. After sending, visual effect (the target prompt information) corresponding to the shortcut word is displayed on the target position to prompt a player in a targeted manner. In addition, if the target position dragged to on the small map is a position of a teammate's avatar, it can be regarded as a special reminder for this teammate, but is not limited thereto.

In some embodiments, when the player opens a strategy panel and drags it after pressing a button on a line where the shortcut word is located, the shortcut word interface is closed and the small map is opened. If the shortcut word interface does not have a page switching function of sliding up and down, then there is no need to add a button additionally. The shortcut word can be directly pressed and dragged to close the shortcut word interface and open the small map. After calling out the small map, the player can select the target position or the target object on the small map to send the shortcut word. The player chooses to send the shortcut word at the target position, and a visual prompt of special effect may appear at the target position. The player chooses to send the shortcut word to a target teammate, that is, drags to the teammate's avatar to send the shortcut word. Then an avatar of the target teammate may be displayed additionally in a central prompt banner.

Figure 12:
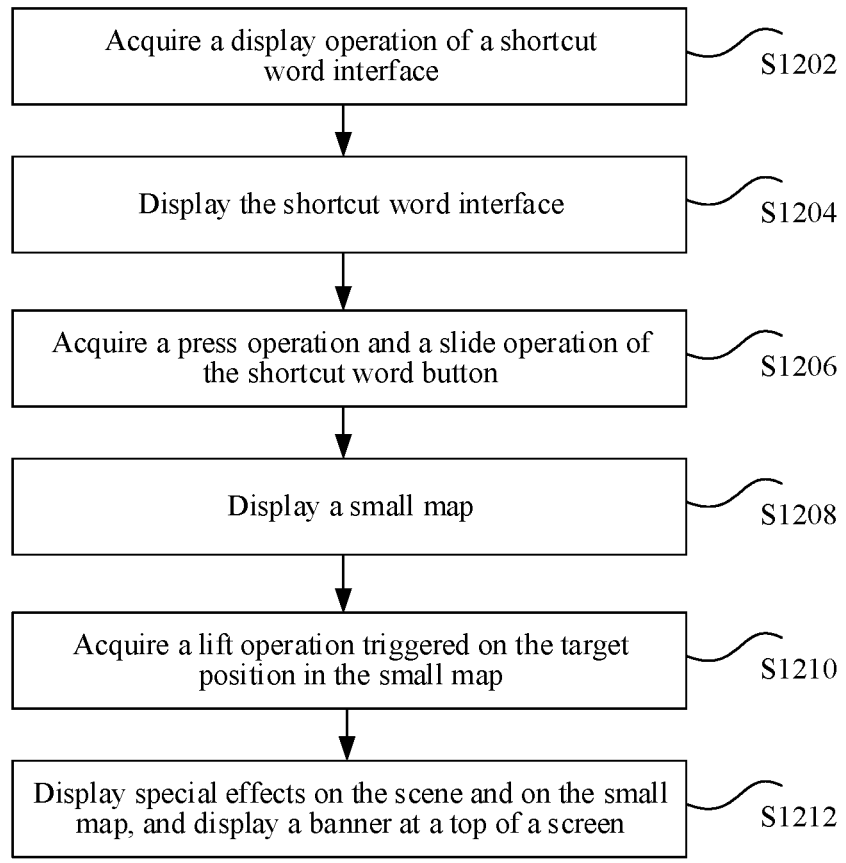
FIG. 12 is a schematic diagram of another optional method for displaying prompt information according to an embodiment of this application.

For further illustration, as shown in FIG. 12, specific steps are as follows:

Step S1202: Acquire a display operation of a shortcut word interface;

Step S1204: Display the shortcut word interface;

S1206: Acquire a press operation and a slide operation of the shortcut word button;

Step S1208: Display a small map;

Step S1210: Acquire a lift operation triggered on the target position in the small map; and Step S1212: Display special effects on the scene and on the small map, and display a banner at a top of a screen.

With the embodiment provided by this application, firstly, this embodiment can combine the shortcut word with location information. For example, shortcut words such as "Enemy disappears", "Pay attention to observation range" and "Don't push alone, you will be ganked" are combined with the location information, so that teammates can know more clearly where the enemy disappears, where it needs to place a guard, and where teammates are easy to be ganked when pushing alone. Secondly, this embodiment can combine the shortcut word with teammate information. For example, shortcut words such as "Good play" and "Need help" are combined with the teammate information, so that the teammates can more specifically express which teammate is praised and which teammate needs to come to cooperate with themselves. Through above means, this embodiment can increase accuracy requirement of players' shortcut word communication in games. Prompt will be clearer and communication will be richer.

It can be understood that in a specific implementation of this application, related data such as user information is involved, and when the above embodiments of this application are applied to specific products or technologies, user's permission or agreement is required, and collection, use and processing of the related data need to be complied with relevant laws, regulations and standards of relevant countries and regions.

It is to be understood that, to simplify the description, the foregoing method embodiments are described as a series of action combination. But a person skilled in the art is to know that this application is not limited to any described sequence of the action, as some steps can adopt other sequences or can be executed simultaneously according to this application. In addition, a person skilled in the art is to also know that all the embodiments described in the specification are preferred embodiments, and the related actions and modules are not necessarily mandatory to this application.

Figure 13:
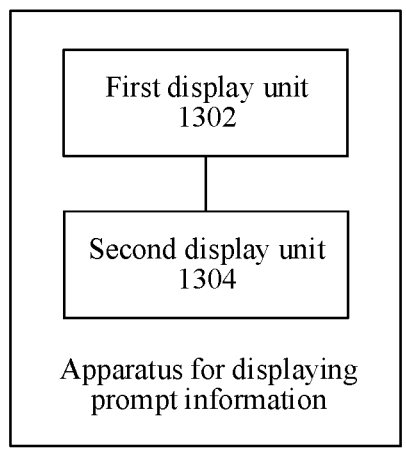
FIG. 13 is a schematic diagram of an optional apparatus for displaying prompt information according to an embodiment of this application.

According to yet another aspect of the embodiments of the application, an apparatus for displaying prompt information in which the method for displaying prompt information described above can be implemented is further provided. As shown in FIG. 13, the apparatus includes:

a first display unit 1302, configured to display a session template interface in a virtual interaction scene, the session template interface containing at least one piece of session template information; and a second display unit 1304, configured to, in response to a target operation on target session template information in the at least one piece of session template information, display information content of the target prompt information at a target position in the virtual interaction scene indicated by the target operation.

In some embodiments, the apparatus for displaying prompt information can be applied to, but not limited to, an interactive scene in which a shortcut word (the session template information) is accurately sent in a game. For example, after a shortcut word interface (the session template interface) is clicked and opened, a virtual button corresponding to the shortcut word (the first operation) is pressed and the drag operation is performed, the shortcut word interface is closed and a small map (the target scene map) is called out. Then, an identifier corresponding to the shortcut word is displayed and dragged on the small map in response to the drag operation, and a position of the target position on the small map in the virtual game scene is selected (the second operation) by using the drag operation so as to send the shortcut word. After sending, visual effect (the target prompt information) corresponding to the shortcut word is displayed on the target position to prompt a player in a targeted manner. In addition, if the target position dragged to on the small map is a position of a teammate's avatar, it can be regarded as a special reminder for this teammate, but is not limited thereto.

In some embodiments, when the virtual game scene contains virtual objects of at least two camps, the target prompt information can be, but is not limited to, prompt information for virtual objects of a same camp. In addition, the target prompt information also can, but is not limited to, be played or sent in a form of voice, video, audio, etc.

In some embodiments, acquiring the target prompt information according to the target session template information and the target position can be understood as, but not limited to, constructing association between the target prompt information corresponding to the target session template information and the target position, for example, determining information content of the target prompt information by using the target session template information and determining a display mode of the target prompt information by using the target position. The display mode can include, but not limited to, a display position, a display format, a display form, etc.

In addition, the acquiring the target prompt information according to the target session template information and the target position can also be understood as, but not limited to, integrating the information content of the target session template information and position information of the target position to acquire the target prompt information that prompts content of the target session template information for the target position. For example, if the content information of the target session template information is "beware of the enemy" and the target position is a position where a friendly defense tower is located, the information content of the target session template information "Beware of the enemy" and position information of the target position (friendly defense tower) are then integrated to acquire target prompt information "Beware of the enemy destroying the tower" which prompts content of the target session template information for the target position (friendly defense tower).

It is to be understood that, the virtual game scene and the session template interface are displayed, and the session template interface contains the at least one piece of session template information. The target prompt information is acquired according to the target session template information and the target position indicated by the target operation, in response to the target operation on target session template information in the at least one piece of session template information. The target prompt information is displayed.

Specific embodiments can refer to examples shown in the method for displaying prompt information described above.

As an alternative scheme, the apparatus further includes: a third display unit, configured to display a target scene map corresponding to the virtual interaction scene in response to the first operation on the target session template information in the at least one piece of session template information; and a second acquisition unit, configured to acquire the target prompt information according to the target session template information and the target position in response to the second operation at the target position on the target scene map.

As an alternative scheme, the second display unit 1304 includes: a first display module, configured to display a first prompt information; the first prompt information including identification information of a target object and the information content of the target session template information.

As an alternative scheme, the apparatus further includes a first acquisition unit, which includes: a first acquiring module, configured to acquire the first prompt information when a distance between a position corresponding to the target position and a position of the target object in the virtual interaction scene is less than or equal to a target threshold in the virtual interaction scene.

As an alternative scheme, the target object includes a first virtual role. The first acquisition unit includes: a second acquiring module, configured to acquire second prompt information, the second prompt information including identification information of the first virtual role, identification information of a second virtual role and the information content of the target session template information, the second virtual role being a virtual role controlled by a second client, and the second client being a client that triggers the target operation; and The apparatus further includes: a sending module, configured to send the second prompt information to the first client, so that the second prompt information is displayed in the first client. The first client being a client that controls the first virtual role.

As an alternative scheme, the target object includes a third virtual role. The first acquisition unit includes: a third acquisition module, configured to acquire target association information between the third virtual role and a second virtual role; the second virtual role being a virtual role controlled by a second client, and the second client being a client that triggers the target operation; and an adjusting module, configured to adjust the information content of the target session template information according to the target association information. The second display unit 1304 includes: a second display module, configured to display third prompt information, the third prompt information including identification information of the third virtual role, the identification information of the second virtual role and information content of the adjusted target session template information.

As an alternative scheme, the adjusting module includes at least one of: a first adjustment submodule, configured to adjust the information content of the target session template information according to account association information between an account corresponding to the third virtual role and an account corresponding to the second virtual role; a second adjustment submodule, configured to adjust the information content of the target session template information according to the role association information between the third virtual role and the second virtual role; and a third adjustment submodule, configured to adjust the information content of the target session template information according to the target association information and expression object information of the information content of the target session template information. The expression object information is used for representing attribute information of an expression object targeted by the information content of the target session template information.

As an alternative scheme, the apparatus includes: a third display module, configured to display a session operation identifier on the session template interface. The session operation identifier is in one-to-one correspondence with the session template information in the at least one piece of session template information. The third display unit includes: a fourth display module, configured to display the target scene map corresponding to the virtual interaction scene in response to the first operation triggered by a target operation identifier corresponding to the target session template information.

As an alternative scheme, the apparatus further includes: an updating module, configured to update the session template information displayed in the session template interface in response to an information switching request triggered by the at least one piece of session template information.

As an alternative scheme, the apparatus includes: a fourth acquiring module, configured to acquire a selection operation performed on the target operation identifier; and a first determining module, configured to determine the selection operation as the first operation triggered on the target operation identifier when an operation duration of the selection operation reaches a target threshold.

As an alternative scheme, the apparatus includes: a second determining module, configured to acquire a first position on the target scene map at an end of the drag operation when the selection operation is not finished and the drag operation in a first direction is acquired; and a third determining module, configured to determine the first position as the target position when the drag operation in the first direction is finished.

As an alternative scheme, the apparatus includes: a fourth determining module, configured to move a display position of the target session template information in the session template interface when the selection operation is not finished and a drag operation in a second direction is acquired.

As an alternative scheme, the apparatus includes: a fourth display unit, configured to display the session template information identifier in the virtual interaction scene. The second display unit 1304 includes: a fifth display module, configured to display the session template interface in the virtual interaction scene in response to an unfolding operation performed on the session template information identifier.

As an alternative scheme, the second display unit 1304 includes at least one of: a sixth display module, configured to display the target prompt information at a position in the virtual interaction scene corresponding to the target position; and a seventh display module, configured to display a prompt identifier matching with the target session template information at the position in the virtual interaction scene corresponding to the target position.

As an alternative scheme, the apparatus further includes: a fifth display unit, configured to display an information configuration interface for the session template information; the information configuration interface including a first configuration interface and a second configuration interface, the first configuration interface containing existing session template information in the session template interface and the second configuration interface containing non-existing session template information in the session template interface; a first configuration unit, configured to perform configuration processing on session template information contained in the target configuration interface in response to an information configuration request triggered on the target configuration interface.

As an alternative scheme, the apparatus further includes: a fifth display unit, configured to display an image template interface in the virtual interaction scene, the image template interface containing at least one template image; a sixth display unit, configured to display the target scene map corresponding to the virtual interaction scene in response to a third operation triggered on a target template image in the at least one template image; a third acquisition unit, configured to acquire a target prompt image according to the target template image and the second position in response to a fourth operation triggered at the second position on the target scene map; and a seventh display unit, configured to display the target prompt image.

Figure 14:
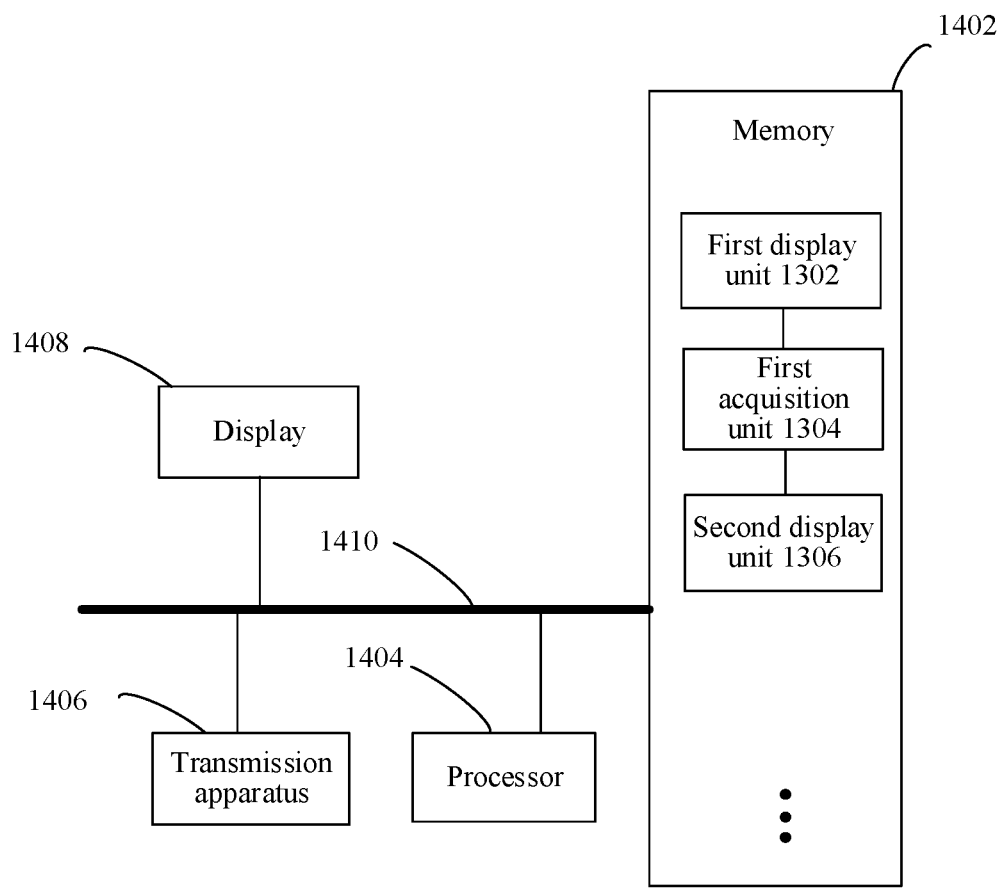
FIG. 14 is a structural schematic diagram of an optional electronic device according to an embodiment of this application.

According to yet another aspect of the embodiment of this application, an electronic device for implementing the method for displaying prompt information is further provided, as shown in FIG. 14. The electronic device includes a memory 1402 and a processor 1404. The memory 1402 has stored therein computer-readable instructions, and the processor 1404 is configured to perform steps in any of above method embodiments by the computer-readable instructions.

In some embodiments, the electronic device may be located in at least one of a plurality of network devices of a computer network.

In some embodiments, the processor may be provided to perform following steps by the computer program:
- S1: Display a session template interface in a virtual interaction scene, the session template interface containing at least one piece of session template information; and
- S2: Display target prompt information in response to a target operation on target session template information in the at least one piece of session template information; the target prompt information being used for characterizing information content of the target session template information and a target position indicated by the target operation.

In some embodiments, those of ordinary skill in the art may understand that, the structure shown in FIG. 14 is only illustrative. The electronic device may be a terminal device such as a smartphone (such as an Android mobile phone or an iOS mobile phone), a tablet computer, a palmtop computer, a mobile Internet device (MID), or a PAD. FIG. 14 does not limit the structure of the foregoing electronic device. For example, the electronic device may further include more or fewer components (for example, a network interface or the like) than those shown in FIG. 14, or has a configuration different from that shown in FIG. 14.

The memory 1402 may be configured to store software readable instructions and a module, for example, a program instruction/module corresponding to the method and apparatus for displaying prompt information in the embodiments of this application, and the processor 1404 runs the software program and the module stored in the memory 1402, so as to perform various function applications and data processing, that is, implement the foregoing method for displaying prompt information. The memory 1402 may include a high-speed random memory, and may also include a non-volatile memory, for example, one or more magnetic storage apparatuses, a flash memory, or another nonvolatile solid-state memory. In some embodiments, the memory 1402 may further include memories remotely disposed relative to the processor 1404, and the remote memories may be connected to a terminal through a network. Examples of the network include, but are not limited to, the Internet, an intranet, a local area network, a mobile communication network, and a combination thereof. The memory 1402 can, but not limited to, be used to store information such as the virtual game scene, the session template interface, and the target prompt information, etc. As an example, as shown in FIG. 14, the memory 1402 may include, but is not limited to, the first display unit 1302 and the second display unit 1304 in the apparatus for displaying prompt information. In addition, it may also include, but is not limited to, other module units in the apparatus for displaying prompt information described above, which will not be repeatedly described in this embodiment again.

In some embodiments, a transmission apparatus 1406 is configured to receive or send data by using a network. Specific examples of the network described above include a wired network and a wireless network. In an example, the transmission apparatus 1406 includes a network interface controller (NIC). The NIC may be connected to another network device and a router via a network cable, so as to communicate with the Internet or the local area network. In an example, the transmission apparatus 1406 is a radio frequency (RF) module, which communicates with the Internet in a wireless manner.

Further, the electronic device includes: a display 1408, configured to display the virtual interaction scene, the session template interface and the target prompt information; and a connection bus 1410, configured to connect various module components in the electronic device.

In another embodiment, the terminal device or server can be a node in a distributed system. The distributed system can be a blockchain system, and the blockchain system can be a distributed system formed by connecting a plurality of nodes through network communication. Nodes can form a peer-to-peer (P2P) network, and any form of computing devices, such as servers, terminals and other electronic devices, can become a node in the blockchain system by joining the peer-to-peer network.

According to an aspect of this application, there is provided a computer program product, which includes computer-readable instructions containing program code for executing the method shown in the flowchart. In such an embodiment, the computer-readable instructions may be downloaded and installed from a network through a communication part, and/or installed from a removable medium.

When the computer-readable instructions are executed by a central processor, various functions provided by the embodiments of the application are executed.

The sequence numbers of the foregoing embodiments of this application are merely for description purpose but do not imply the preference among the embodiments.

It is to be understood that, the computer system of the electronic device is merely an example, and does not constitute any limitation on functions and use ranges of the embodiments of this application.

The computer system includes a central processing unit (CPU), which may perform various suitable actions and processing based on the computer-readable instructions stored in a read-only memory (ROM) or computer-readable instructions loaded from a storage part into a random access memory (RAM). Various computer-readable instructions and data required for system operations are also stored in the random access memory. The central processor, the read-only memory and the random access memory are connected to each other through a bus. An input/output (I/O) interface is also connected to the bus.

Following components are connected to the input/output interface: an input part including a keyboard, a mouse or the like; an output part including a cathode ray tube (CRT), a liquid crystal display (LCD), a speaker, or the like; a storage part including a hard disk, or the like, and a communication part including a network interface card such as a local area network (LAN) card or a modem. The communication part performs communication processing by using a network such as the Internet. The driver is also connected to the input/output interface as required. A removable medium, such as a magnetic disk, an optical disc, a magneto-optical disk, or a semiconductor memory, is installed on the drive as required, so that computer-readable instructions read from the removable medium is installed into the storage part as required.

In particular, according to the embodiments of this application, processes described in various method flowcharts can be implemented as computer-readable instructions. For example, this embodiment of this application includes a computer program product, the computer program product includes a non-transitory computer-readable instruction carried on a non-transitory computer-readable medium, and the computer-readable instruction includes program code used for performing the methods shown in the flowcharts. In such an embodiment, the computer-readable instructions may be downloaded and installed from a network through a communication part, and/or installed from a removable medium. When the computer-readable instructions are executed by a central processor, the various functions defined in the system of this application are executed.

According to an aspect of this application, a non-transitory computer-readable storage medium is provided, and a processor of a computer device reads the computer-readable instructions from a non-transitory computer-readable storage medium, and the processor executes the computer-readable instructions to cause the computer device to perform the methods provided in the various alternative implementations described above.

In some embodiments, the above computer-readable storage medium may be configured to store computer-readable instructions for performing following steps:

S1: Display a session template interface in a virtual interaction scene, the session template interface containing at least one piece of session template information; and S2: Display target prompt information in response to a target operation on target session template information in the at least one piece of session template information; the target prompt information being used for characterizing information content of the target session template information and a target position indicated by the target operation.

In some embodiments, those of ordinary skill in the art can understand that, all or some steps in the various methods in the foregoing embodiments may be completed by instructing the hardware related to terminal equipment through a non-transitory computer-readable instruction, and the computer-readable instruction can be stored in a non-transitory computer-readable storage medium. The storage medium may include: a flash drive, a Read-Only Memory (ROM), a Random Access Memory (RAM), a magnetic disk, an optical disc, and the like.

The sequence numbers of the foregoing embodiments of this application are merely for description purpose but do not imply the preference among the embodiments.

When the integrated unit in the foregoing embodiments is implemented in a form of a software functional unit and sold or used as an independent product, the integrated unit may be stored in the foregoing computer-readable storage medium. Based on such an understanding, the technical solutions of this application essentially, or the part contributing to the prior art, or all or some of the technical solutions may be embodied in a form of a software product. The computer software product is stored in a storage medium and includes several instructions for instructing one or more computer devices (which may be a personal computer, a server, a network device, or the like) to perform all or some of the steps of the methods described in the embodiments of this application.

In the foregoing embodiments of this application, description of respective embodiments has its own emphasis. For parts not detailed in one embodiment, reference can be made to related descriptions of other embodiments.

In the several embodiments provided in this application, it is to be understood that, the disclosed client may be implemented in another manner. The foregoing described apparatus embodiments are merely examples. For example, the unit division is merely logical function division and there may be other division methods in actual implementation. For example, multiple units or components may be combined or integrated into another system, or some features may be omitted or not performed. In addition, the coupling, or direct coupling, or communication connection between the displayed or discussed components may be the indirect coupling or communication connection by means of some interfaces, units, or modules, and may be electrical or of other forms.

Units described as separate parts may or may not be physically separate, and components displayed as units may or may not be physical units, that is, may be located in one position, or may be distributed on a plurality of network units. Some or all of the units may be selected according to actual needs to achieve objectives of the schemes of the embodiments.

In addition, respective functional units in respective embodiments of this application may be integrated into one processing unit, or respective units may physically separately exist, or two or more units may be integrated into one unit. The integrated unit may be implemented in the form of hardware, or may be implemented in a form of a software functional unit.

In this application, the term "module" or "unit" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module or unit can be implemented using one or more processors (or processors and memory). Likewise, a processor (or processors and memory) can be used to implement one or more modules or units. Moreover, each module or unit can be part of an overall module or unit that includes the functionalities of the module or unit. The above descriptions are merely preferred embodiments of this application, and it is to be understood that, a person of ordinary skill in the art may make various improvements and refinements without departing from the spirit of this application. All such modifications and refinements should also be intended to be covered by this application.

What is claimed is:

1. A method for displaying prompt information performed by an electronic device acting as a first electronic device participating in a virtual interaction scene, the method comprising:
    displaying a messaging interface in response to an operation on a session template information identifier in the virtual interaction scene, the messaging interface containing at least one piece of message template;
    detecting a selection operation at a location within the messaging interface corresponding to a target piece of message template of the at least one piece of message template;
    while the selection operation corresponding to the at least one piece of message template is being continued:
        detecting a drag operation starting from the location within the messaging interface corresponding to the target piece of message template of the at least one piece of message template;
        in response to the drag operation:
            displaying a map of the virtual interaction scene in replacement of the messaging interface, the map including a first icon representing a second electronic device participating in the virtual interaction scene and a second icon representing a third electronic device participating in the virtual interaction scene;
    in response to a termination of the drag operation within the map:
        determining an ending position of the drag operation in the map;
        determining a corresponding location in the virtual interaction scene mapping to the ending position of the drag operation in the map;
        removing the map from the virtual interaction scene;
        in response to a determination that the ending position of the drag operation is not within a predefined distance from any of the first icon representing the second electronic device and the second icon representing the third electronic device:
            displaying a first target prompt information corresponding to the target piece of message template at the corresponding location in the virtual interaction scene; and
            transmitting a first instruction causing both the second electronic device and the third electronic device to display the first target prompt information corresponding to the target piece of message template at a target position in the virtual interaction scene; and
        in response to a determination that the ending position of the drag operation is within the predefined distance from the first icon representing the second electronic device but not on the first icon or within the predefined distance from the second icon representing the third electronic device:
            displaying a second target prompt information corresponding to the target piece of message template and an identifier of the second electronic device at the corresponding location in the virtual interaction scene; and
            transmitting a second instruction causing only the second electronic device to display the second target prompt information corresponding to the target piece of message template at the target position in the virtual interaction scene.

2. The method according to claim 1, wherein the target position is within view of sight of the second electronic device.

3. The method according to claim 1, wherein the second target prompt information comprises an information content or an identifier corresponding to the target piece of message template.

4. The method according to claim 1, wherein the second instruction further causes the second electronic device to display identification information of the first electronic device as a sender of the second target prompt information.

5. The method according to claim 1, further comprising:
    determining the target position based on the ending position of the dragging operation on the map.

6. The method according to claim 5, wherein the determining the target position based on the ending position of the dragging operation on the map comprises:
    determining the target position in the virtual interaction scene based on the ending position on the map and a mapping relationship between the map and the virtual interaction scene.

7. The method according to claim 5, further comprising:
    in response to a start of the dragging operation, displaying the map; and
    in response to an end of the dragging operation, canceling the displaying the map.

8. The method according to claim 5, wherein the determining the target position based on the ending position of the dragging operation on the map comprises:
    determining the ending position indicating a selection of the first icon representing the second electronic device; and
    determining a position of the second electronic device in the virtual interaction scene as the target position.

9. The method according to claim 5, wherein in response to the ending position indicating a selection of the first icon representing the second electronic device:
    the second instruction further causes the second electronic device to display identification information of the second electronic device as a recipient.

10. The method according to claim 1, further comprising:
    generating a message based on the target piece of message template and a relationship between the first electronic device and the second electronic device.

11. The method according to claim 1, wherein the second electronic device is a teammate of the first electronic device in the virtual interaction scene.

12. The method according to claim 1, wherein the second instruction further causes the second electronic device to display the second target prompt information in a mini-map.

13. An electronic device acting as a first electronic device participating in a virtual interaction scene, the electronic device comprising a memory and a processor, computer-readable instructions stored in the memory that, when executed by the processor, cause the electronic device to perform a method for displaying prompt information including:
- displaying a messaging interface in response to an operation on a session template information identifier in the virtual interaction scene, the messaging interface containing at least one piece of message template;
- detecting a selection operation at a location within the messaging interface corresponding to a target piece of message template of the at least one piece of message template;
- while the selection operation corresponding to the at least one piece of message template is being continued:
  - detecting a drag operation starting from the location within the messaging interface corresponding to the target piece of message template of the at least one piece of message template;
  - in response to the drag operation:
    - displaying a map of the virtual interaction scene in replacement of the messaging interface, the map including a first icon representing a second electronic device participating in the virtual interaction scene and a second icon representing a third electronic device participating in the virtual interaction scene;
- in response to a termination of the drag operation within the map:
  - determining an ending position of the drag operation in the map;
  - determining a corresponding location in the virtual interaction scene mapping to the ending position of the drag operation in the map;
  - removing the map from the virtual interaction scene;
  - in response to a determination that the ending position of the drag operation is not within a predefined distance from any of the first icon representing the second electronic device and the second icon representing the third electronic device:
    - displaying a first target prompt information corresponding to the target piece of message template at the corresponding location in the virtual interaction scene; and
    - transmitting a first instruction causing both the second electronic device and the third electronic device to display the first target prompt information corresponding to the target piece of message template at a target position in the virtual interaction scene; and
  - in response to a determination that the ending position of the drag operation is within the predefined distance from the first icon representing the second electronic device but not on the first icon or within the predefined distance from the second icon representing the third electronic device:
    - displaying a second target prompt information corresponding to the target piece of message template and an identifier of the second electronic device at the corresponding location in the virtual interaction scene; and
    - transmitting a second instruction causing only the second electronic device to display the second target prompt information corresponding to the target piece of message template at the target position in the virtual interaction scene.

14. The electronic device according to claim 13, wherein the target position is within view of sight of the second electronic device.

15. The electronic device according to claim 13, wherein the second target prompt information comprises an information content or an identifier corresponding to the target piece of message template.

16. The electronic device according to claim 13, wherein the second instruction further causes the second electronic device to display identification information of the first electronic device as a sender of the second target prompt information.

17. The electronic device according to claim 13, wherein the method further comprises:
- determining the target position based on the ending position of the dragging operation on the map.

18. The electronic device according to claim 13, wherein the method further comprises:
- generating a message based on the target piece of message template and a relationship between the first electronic device and the second electronic device.

19. The electronic device according to claim 13, wherein the second instruction further causes the second electronic device to display the second target prompt information in a mini-map.

20. A non-transitory computer-readable storage medium, storing computer readable instructions that, when executed by a processor of an electronic device participating in a virtual interaction scene, cause the electronic device to perform a method for displaying prompt information including:
- displaying a messaging interface in response to an operation on a session template information identifier in the virtual interaction scene, the messaging interface containing at least one piece of message template;
- detecting a selection operation at a location within the messaging interface corresponding to a target piece of message template of the at least one piece of message template;
- while the selection operation corresponding to the at least one piece of message template is being continued:
  - detecting a drag operation starting from the location within the messaging interface corresponding to the target piece of message template of the at least one piece of message template;
  - in response to the drag operation:
    - displaying a map of the virtual interaction scene in replacement of the messaging interface, the map including a first icon representing a second electronic device participating in the virtual interaction scene and a second icon representing a third electronic device participating in the virtual interaction scene;
- in response to a termination of the drag operation within the map:
  - determining an ending position of the drag operation in the map;
  - determining a corresponding location in the virtual interaction scene mapping to the ending position of the drag operation in the map;
  - removing the map from the virtual interaction scene;

in response to a determination that the ending position of the drag operation is not within a predefined distance from any of the first icon representing the second electronic device and the second icon representing the third electronic device:
- displaying a first target prompt information corresponding to the target piece of message template at the corresponding location in the virtual interaction scene; and
- transmitting a first instruction causing both the second electronic device and the third electronic device to display the first target prompt information corresponding to the target piece of message template at a target position in the virtual interaction scene; and in response to a determination that the ending position of the drag operation is within the predefined distance from the first icon representing the second electronic device but not on the first icon or within the predefined distance from the second icon representing the third electronic device:
- displaying a second target prompt information corresponding to the target piece of message template and an identifier of the second electronic device at the corresponding location in the virtual interaction scene; and
- transmitting a second instruction causing only the second electronic device to display the second target prompt information corresponding to the target piece of message template at the target position in the virtual interaction scene.

* * * * *